April 17, 1962     N. D. LAMBERSON     3,029,787
CLAW ASSEMBLY FOR MILKING MACHINES Filed May 7, 1959

INVENTOR.
NATHANIEL D. LAMBERSON
BY
Lowell & Henderson
ATTORNEYS 3,029,787
Patented Apr. 17, 1962

3,029,787
CLAW ASSEMBLY FOR MILKING MACHINES
Nathaniel D. Lamberson, Oskaloosa, Iowa, assignor to Ideal Mfg. Co., Oskaloosa, Iowa, a corporation of Iowa
Filed May 7, 1959, Ser. No. 811,558
5 Claims. (Cl. 119—14.54)

This invention relates generally to milking machines and particularly to a claw assembly for a milking machine of the pulsator type.

It is an object of this invention to provide a novel and improved claw assembly for a milking machine of the pulsator type.

As a further object, the claw assembly of the present invention is constructed so that all surfaces are visible and easily reached for cleaning, polishing and inspection. The construction of the assembly is of a stainless material and with all components being self-aligning for ease of assembly.

The claw assembly of this invention has the advantage of an arrangement whereby all the conduits which lead to the teat cups converge at their juncture with the main conduits, and with the structure of the junction being such as to facilitate a cleaning of the assembly on the spot, so to speak, and with a minimum of cleaning problems.

This invention also provides an assembly wherein the air and milk claw members are advantageously completely separable, but wherein these members are adaptable to being assembled into a solidly held unit for ease of handling purposes.

Further objects, features and advantages of this invention, such as its economical manufacture, and efficient and effective use, will become apparent from the following description when taken in connection with the accompanying drawings, wherein.

Figure 1:
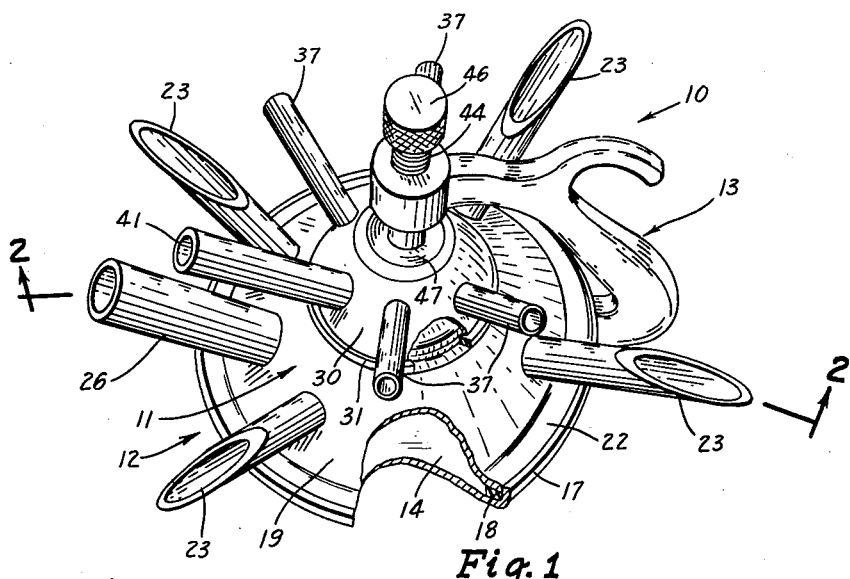
FIG. 1 is a perspective view of a preferred embodiment of this invention, with certain parts broken away for the purpose of clarity.

Referring to the drawings, the claw assembly of this invention is illustrated generally at 10 in FIG. 1 as comprising an air claw 11 which is clamped to a milk claw 12 by means of a C clamp 13. The assembly is adapted for use with a milker machine (not shown) of the pulsator type.

The milk claw 12 includes a substantially flat base 14 (FIG. 2) having a raised portion 16 centrally thereof and with a peripheral flange 17 formed in an upturned manner. A gasket 18 is fitted within the flange 17 and provides a seat for a housing 19.

The housing 19 is of a generally frusto-conical shape closed at the top and including an inclined side wall 21 terminating at its lower end in a laterally extended lip or flange 22 which seats on the gasket 18. The lip 22 is of a circumference relative to the inner diameter of the flange 17 whereby it may readily be seen that the assembly of the housing 19 of the base 14 is of a self-aligning nature. When assembled the housing 19 and the base 14 form a milk chamber 20.

Figure 2:
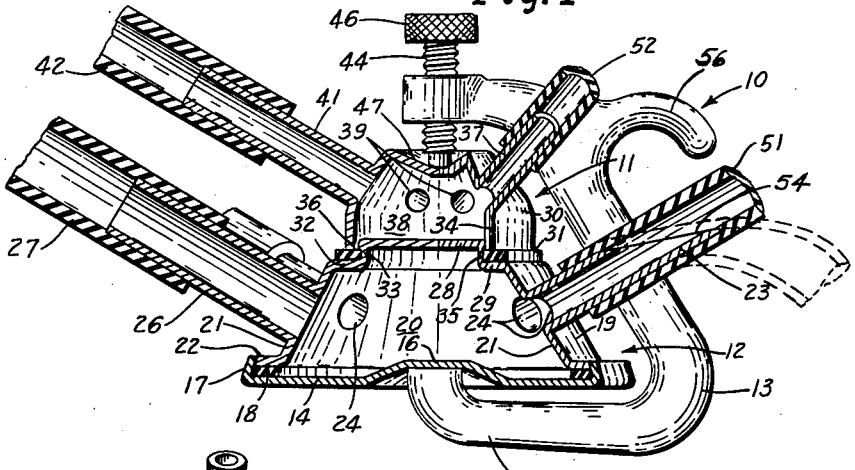
FIG. 2 is a sectional view taken along the line 2—2 in FIG. 1, and with conduits being shown connected to the respective tubes.

Four milk tubes 23, integrally formed with the side wall 21, are arranged in an angularly spaced manner about the housing 19 whereby to form, in plan, an X formation, and with the inner ends of the tubes fluid connected to the chamber 20 by means of openings 24 (FIG. 2). A main milk tube 26, integral with the side wall 21 and open to the chamber 20, is connected via a conduit 27 with a milk receptacle (not shown) which is maintained under a subatmospheric pressure in the operation of the milking machine.

Referring to FIG. 2, the top of the milk housing 19 includes a substantially flat wall 28 which is joined to the annular side wall 21 by a step section 32 so as to form a shoulder 29. A gasket 31 is adapted to be placed on the shoulder 29 whereby to fit snugly in a self-aligning manner with the upright portion 33 of the section 32.

The gasket 31 serves as a seat for the air claw 11 which comprises a housing 30 of a substantially dome shape, closed at the top and open at the bottom, and including an annular side wall 34 which has a predetermined inner diameter at its lower portion 36 such that it seats on the gasket 31 closely adjacent the upright portion 33 of the step section 32, (FIG. 2).

The air claw 11 includes further four tubes 37, integrally formed with the side wall 34 and open at 39 to an air chamber 38, formed by the side wall 34 and the top 28 of the housing 19. The air tubes 37 are divided into two pairs, whereby the tubes of each pair are more closely spaced than are the milk tubes 23. A main air tube 41, integral with the side wall 34 and open to the chamber 38, is connected via a conduit 42 to a pulsator apparatus (not shown) of the milking machine, which apparatus functions in a well known manner to deliver air at alternately high and low pressures to the chamber 38.

In the assembly of the units 11 and 12, the gasket 18 is seated in the base 14 and the milk claw housing 19 is then placed over the gasket 18. The other gasket 31 is inserted on the step section 32 of the shoulder 29, and the air claw housing is then placed on top of the gasket 31. It may readily be seen that these five unitary components are self-aligning and constructed to facilitate easy cleaning with a minimum of effort. During the cleaning and other handling of these components when separated, by the provision of a slight acute angle between the flange 17 and the base 14 (FIG. 2), the gasket 18 is securely held in place. Likewise, by providing a slight undercut 35 (FIG. 2) in the outer surface of the upright portion 33 next to the step 32, the gasket 31 is also held securely in place.

To securely assemble the air and milk claw units 11 and 12 together, so that the claw assembly 10 may be readily and easily handled for use, the clamp unit 13 includes a lower finger 43 adapted to fit into the raised portion 16 of the base 14, an upper finger 45, and a threaded rod 44 having a knurled knob 46. The rod 44 is threaded through the finger 45 for engagement with the depression 47 formed in the top of the air claw housing 30. Thus the assembly 10 is effected by merely slipping the C clamp 13 into place with the finger 43 fitted into the portion 16 and threading down the rod 44 to engage the depression 47. By backing off the rod 44 from an engagement with the depression 47, the C clamp 13 may be quickly removed from the assembly, thereby enabling the air and milk units to be separated for cleaning purposes.

Figure 3:
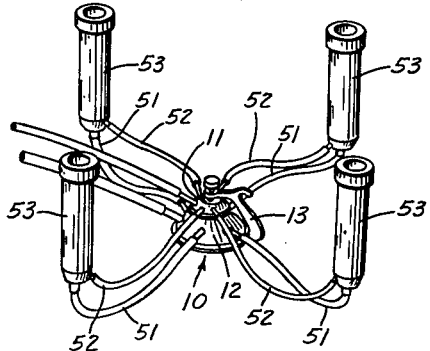
FIG. 3 is a reduced perspective view of the claw assembly of this invention in operative position and connected to the teat cups.

In use, each milk tube 23 is fluid connected by a line 51, and each air tube 37 is fluid connected by a line 52, to a conventional teat cup 53 for positioning on a cow. By referring to FIG. 3, it may well be seen that the claw assembly 10, by means of its radial arrangement of milk and air tubes, is adapted perfectly for a balanced connection to the four teat cups 53. By this arrangement whereby the assembly 10 is held, when in use, at the knob 46, it is maintained substantially in the horizontally disposed suspended position as illustrated in FIG. 3, thus enabling all tubes to be free of bends and kinks which would adversely affect their efficiency.

In line with this, there are of course circumstances where a teat cup 53 is not being used, for example where a quarter of the cow is not being milked, or is finished before the others, etc. To provide for this contingency and to obviate the loss of vacuum in the system, a bevel cut 54 (FIG. 2) is taken at the end of each milk tube 23. Thus, should the cup 53 in the right foreground of FIG. 3, for example, not be used, the lines 51 and 52 attached thereto are kinked downwardly over the respective ends of their tubes 23 and 37. As shown by the dotted line of FIG. 2, the milk tube 51 lays over the bevel cut 54 thus substantially closing off this passageway for vacuum. A slight leak will not interfere with normal milking operations.

Additionally, so as to prevent the cup 53 from contacting the floor or other unsanitary structures, the lines 51 and 52 of the above-designated cup 53, after being kinked, can be hooked under the outwardly extended hook portion 56 provided therefor which is integral with the upper clamp unit finger 45. The lines and the cup can then be laid across another pair of lines, letting the cup hang downwardly. As the tendency of the lines 51 and 52 is to flex or bend upwardly, it may readily be appreciated that by placing particularly the line 51 under the hook portion, this tendency is controlled to the extent that the closing off of the tube 23 is maintained, or putting it another way, the line 51 is prevented from bending upwardly from the tube 23 to thereby open the tube 23 to the line 51.

Although the invention has been described with respect to a preferred embodiment thereof, it is not to be so limited since changes can be made which are within the full intended scope of this invention as defined by the appended claims.

I claim:

1. A claw assembly for a milking machine comprising, a milk-carrying housing, a plurality of milk tubes extended radially outwardly from said housing, said housing having an annular shoulder formed thereon, an air-carrying housing having an annular flange adapted to fit snugly with said shoulder, a plurality of air tubes extended radially outwardly from said air-carrying housing, fluid transmitting lines secured to the outer ends of said air and milk tubes and means for clamping said housings together including an outwardly extended element beneath which said lines are placeable, said element located relative to said outer ends whereby said lines so placed are bent over said outer ends so as to substantially close off said lines from said air and milk tubes.

2. A claw assembly for a milking machine comprising, a milk-carrying housing of circular shape open at the bottom and closed at the top, a substantially flat, circular bottom element adapted to fit snugly over so as to close said open housing bottom, an annular shoulder formed in the top of said housing, a plurality of milk tubes extended radially outwardly from said housing, an air-carrying housing of circular shape, a plurality of air tubes extended radially outwardly from said air-carrying housing, said ar-carrying housing closed at the top and having an opening at the bottom adapted to fit snugly with said annular shoulder, whereby the top of said milk-carrying housing serves as the bottom of said air-carrying housing, fluid transmitting lines secured to the outer ends of said air and milk tubes, and means for clamping said housings together including an outwardly extended element beneath which said lines are placeable, said element located relative to said outer ends whereby said lines so placed are bent over said outer ends so as to substantially close off said lines from said air and milk tubes.

3. A claw assembly for a milking machine including a first housing open at one end and closed at the other end thereof, a second housing having a closed end and an open end in seating engagement with the closed end of said first housing to form an air chamber, a cover member in seating engagement with the open end of said first housing to form a milk chamber therewith, clamp means engageable with said cover member and the closed end of said second housing to maintain said seating engagements, a plurality of milk tubes on said first housing in fluid connection with said milk chamber, a plurality of air tubes on said second housing in fluid connection with said air chamber, a plurality of fluid transmitting flexible lines attached to the outer ends of said air and milk tubes, and a downwardly curved element formed on said clamp means, said element located relative to said outer ends whereby the placement of one or more lines below said element results in said one or more lines being bent over respective ones of said outer ends to substantially cut off the flow of fluid therethrough.

4. A claw assembly for a milking machine comprising, a substantially flat, circular bottom element having a peripheral upturned flange, a sealing ring placed flat on said element and with the periphery of said ring contiguous with said flange, a milk-carrying housing having a top wall and an annular side wall and with an annular shoulder formed therebetween, an outwardly flared peripheral portion at the bottom of said side wall adapted to seat on said sealing ring, a plurality of milk tubes extended radially upwardly and outwardly from said housing and with the outer ends thereof beveled, another sealing ring inserted about said shoulder, an air-carrying housing open at the bottom and having a closed top and an annular side wall the lower portion of which is adapted to seat on said another sealing ring, a plurality of air-carrying tubes extended radially outwardly from said air-carrying housing, a plurality of flexible fluid transmitting lines secured to the outer ends of said air and milk tubes, said lines for said milk tubes adapted to close off fluid transmission therebetween upon being bent downwardly over said beveled outer ends, and means for clamping said housings, seals and bottom element together whereby to form a pair of separated fluid chambers, said clamping means including an outwardly extended hook portion for retaining any one or more of said lines placed thereunder in a downwardly bent position.

5. A claw assembly for a milking machine comprising, a milk claw unit including a circular milk-carrying housing, a plurality of milk tubes extended radially outwardly from said housing at least one or more of which have a bevel cut at the end thereof, an air claw unit adapted to seat on said milk-carrying housing, and means for clamping said housing and said air claw unit together and including a hooked portion extended outwardly from said units.

References Cited in the file of this patent
UNITED STATES PATENTS

| | | |
|---|---|---|
| 1,583,580 | Dinesen | May 4, 1926 |
| 2,518,589 | Anderson | Aug. 15, 1950 |

FOREIGN PATENTS

| | | |
|---|---|---|
| 7,113 | Australia | Aug. 30, 1932 |